(12) United States Patent
Kashimoto (10) Patent No.: US 8,068,128 B2
(45) Date of Patent: Nov. 29, 2011

(54) VISUAL COMMUNICATION SERVER AND COMMUNICATION SYSTEM

(75) Inventor: Shinichi Kashimoto, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 896 days.

(21) Appl. No.: 12/103,870

(22) Filed: Apr. 16, 2008

(65) Prior Publication Data

US 2008/0266376 A1    Oct. 30, 2008

(30) Foreign Application Priority Data

Apr. 27, 2007   (JP) ................................. 2007-119474

(51) Int. Cl.
*G66F 15/16*    (2006.01)
(52) U.S. Cl. .................. 348/14.09; 348/14.08; 709/205; 379/265.09
(58) Field of Classification Search .... 348/14.08–14.09; 709/205, 217–219; 379/265.01–266.1, 308–309; 370/352

See application file for complete search history.

(56) References Cited

U.S. PATENT DOCUMENTS 6,754,693 B1 *   6/2004   Roberts et al. ................ 709/205
7,725,540 B2 *   5/2010   Roberts et al. ................ 709/205

FOREIGN PATENT DOCUMENTS

| JP | 10-240656 | 9/1998 |
| JP | 2004-186967 | 7/2004 |
| JP | 2004-326395 | 11/2004 |

\* cited by examiner

*Primary Examiner* — Suhan Ni
(74) *Attorney, Agent, or Firm* — Pillsbury Winthrop Shaw Pittman, LLP

(57) ABSTRACT

According to one embodiment, a server includes a control unit which instructs establishment and end of connection for the video data communications between the client computers corresponding to the telephone terminals, in accordance with the call information event received by the call information event receiving unit, and a connection information transmitting unit which transmits connection information between the plurality of client computers for which one of the establishment and the end of connection is executed by the control unit, wherein even if the connection information transmitting unit receives a notification of completion or end of the connection from the client computers, when the connection information transmitting unit receives a notification which accompanies change of connection states of the client computers, the connection information transmitting unit transmits the connection information after waiting for the change of the connection states.

6 Claims, 5 Drawing Sheets

FIG. 6 ptal # VISUAL COMMUNICATION SERVER AND COMMUNICATION SYSTEM

CROSS-REFERENCE TO RELATED APPLICATIONS

This application is based upon and claims the benefit of priority from Japanese Patent Application No. 2007-119474, filed Apr. 27, 2007, the entire contents of which are incorporated herein by reference.

BACKGROUND

1. Field

One embodiment of the present invention relates to a visual communication server and a communication system, capable of implementing a visual communication function by, for example, an existing telephone system and an existing computer system.

2. Description of the Related Art

In general, client software for television conference has been installed in computers, a system capable of easily and simply constructing a television conference mode in combination with telephones equipped with a speech function for television conference (visual communication system: hereinafter called VCS) has appeared. In such a television conference system of the mode in which the client software for television conference is installed in computers, the telephones need to be connected to computers, respectively, i.e. the telephones need to be prepared, at high costs.

Then, there is an idea of utilizing an existing telephone system which has been upgraded as infrastructure.

As for the prior art of utilizing an existing telephone system, for example, a technique of notifying a client terminal with notification of an incoming call of an extension telephone by associating a private branch exchange with a server, has been disclosed (for example, refer to Jpn. Pat. Appln. KOKAI Publication No. 10-240656).

According to the prior art, however, the server has only a function of repeating the notification of an incoming call of an extension telephone to the client terminal, and only speech conversation is subjected to communications. For this reason, to implement a speech and image-communications function, either of the above-explained television conference systems needs to be installed and, as a result, they can hardly be utilized due to high costs.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a visual communication server, connected to a telephone exchange for controlling line connection between telephone terminals and to client computers arranged in accordance with the respective telephone terminals to execute video data communications, via networks, the server comprising: a call information event receiving unit which receives a call information event generated by behavior of the telephone terminal, from the telephone exchange; a control unit which instructs establishment and end of connection for the video data communications between the client computers corresponding to the telephone terminals, in accordance with the call information event received by the call information event receiving unit; and a connection information transmitting unit which transmits connection information between the plurality of client computers for which one of the establishment and the end of connection is executed by the control unit, wherein even if the connection information transmitting unit receives a notification of completion or end of the connection from the client computers, when the connection information transmitting unit receives a notification which accompanies change of connection states of the client computers, the connection information transmitting unit transmits the connection information after waiting for the change of the connection states.

Embodiments of the present invention will be described below with reference to the accompanying drawings.

Figure 1:
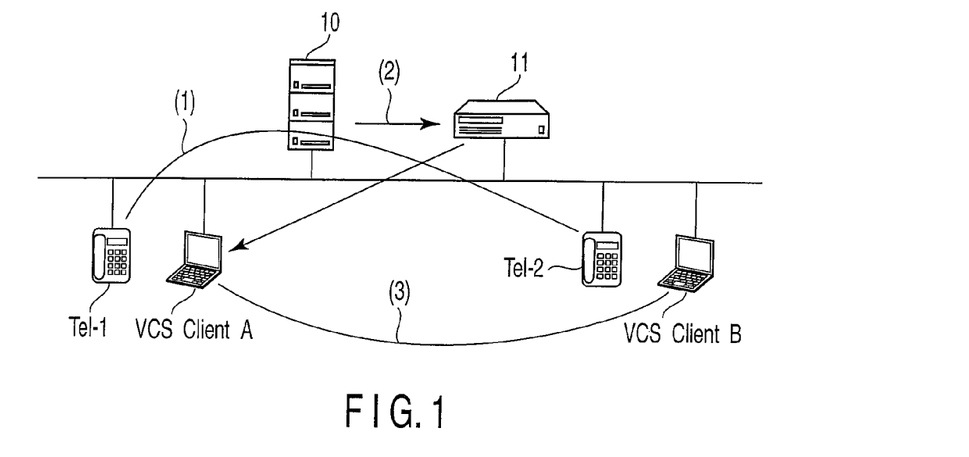
FIG. 1 is a schematic illustration showing a configuration of a communication system according to an embodiment of the present invention.

FIG. 1 is a schematic illustration showing a configuration of a communication system according to an embodiment of the present invention.

The communication system comprises a telephone switch 10, a visual communication server (hereinafter called VCS server) 11, a VCS client A (client terminal), Tel-1 (client terminal) registered in the VCS server 11 as paired with the VCS client A, a VCS client B (client terminal), Tel-2 (client terminal) registered in the VCS server 11 as paired with the VCS client B, and the like.

Each of the VCS clients preliminarily registers a telephone number of the telephone terminal paired with the own VCS client, in the VCS server 11. For example, the telephone number of Tel-1 as paired with the VCS client A is registered in the VCS server 11. Next, for example, Tel-1 and Tel-2 start speech communications ((1) in FIG. 1). The telephone switch 10 notifies the VCS server 11 of telephone numbers of a plurality of telephones which have started speech conversation ((2) in FIG. 1), and the VCS server 11 instructs connection between the telephone terminals (Tel-1 and Tel-2) corresponding to these telephone numbers and a plurality of VCS clients (VCS client A-VCS client B) as paired with the telephone terminals ((3) in FIG. 1). Video communications (image data communications) associated with two-party or multi-party speech communications can be thereby executed.

The video communications are associated with start/end of the speech communication between the telephone terminals.

On the other hand, screen sharing between the VCS clients (real-time/interactive sharing of conference references and the like), file transfer (transferring the conference references and the like on the shared screen before the end of conference), and instant message (exchanging text messages and the like at a real time) are not associated with the start/end of the speech communications between the telephone terminal. In other words, after the speech communications have been started, the video communications are started at the time when the user selects the objective screen to be shared, inputs a message or selects a transfer file. Similarly, the "end" of the screen sharing, the file transfer and the instant message ends by an operation irrespective of the start/end of the speech communications between the telephone terminals.

Figure 2:
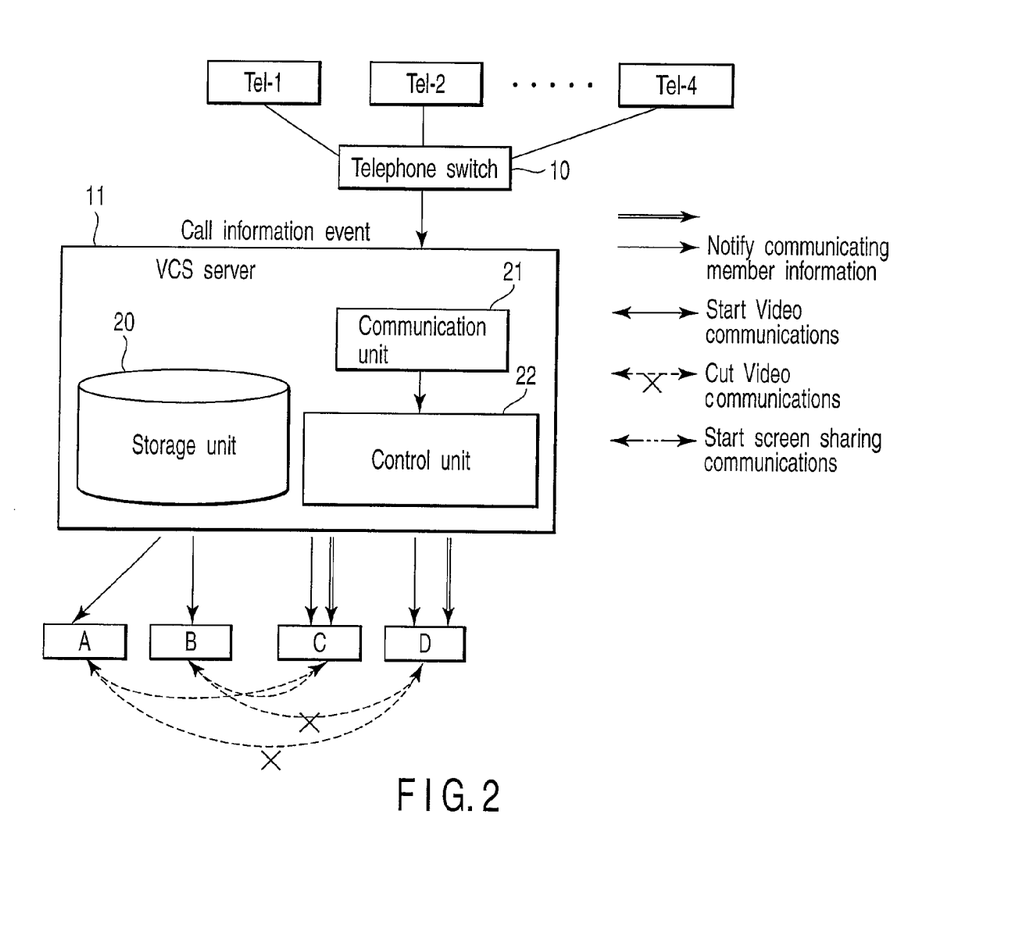
FIG. 2 is a block diagram showing a configuration of the communication system according to the embodiment of the present invention.

Next, FIG. 2 is a block diagram showing a configuration of the communication system according to the embodiment of the present invention. In the system configuration, four VCS clients A to D are connected to the VCS server 11, and the telephone terminals Tel-1 to Tel-4 corresponding to the respective clients are connected to the telephone switch 10.

The VCS server 11 comprises a storage unit 20, a communication unit 21 and a control unit 22. The storage unit 20 stores session information transmitted from the server to start/end the video communication in association with telephone, associated media information to instruct association of media such as video communication, screen sharing, file transfer, instant message and the like, communicating member information (connection information) indicating a communications state of each of the VCS clients whose connection is established by the VCS server 11, telephone terminals (telephone numbers) of the VCS clients and their pairs, a buddy list of names of the VCS clients serving as partners of communications, and the like. The communicating member information includes VCS client identifier information indicating identification of the VCS clients, and media type information indicating media types (for example, "video communications") of the communications among the VCS clients.

The communication unit 21 executes communications between the VCS server 11, and the telephone switch 10 and each of the VCS clients. The control unit 22 controls establishment of the connection with each of the VCS clients, transmission of the communicating member information to each of the VCS clients, and the like.

The telephone terminals Tel-1 to Tel-4 are paired with the VCS clients A to D, respectively. The information of these pairs is preliminarily registered in the storage unit 20 of the VCS server 11.

When a process is executed in response to a session control request (session information) transmitted from the telephone switch 10 to start/end the video communications in association with each of the telephone terminals (Tel-1 to Tel-4), or when the start of screen sharing with the partner of the speech communications is executed, the VCS server 11 notifies the communications partners of the communicating member information. Policies of notification of the communicating member information from the VCS server 11 are set, for example, in the following manner.

To the VCS clients A to D, "Notify only information of the member with which the VCS client is currently communicating, from the server" (hereinafter first notification policy: first notification state).

In addition, the policy can also be changed as follows.

"Notify at any time not only the information of the member with which the VCS client is currently communicating, but also the VCS client communicating member information except the VCS client" (hereinafter second notification policy: second notification state).

Since various notification methods can be selected by changing the notification policy of the server side in this manner, the communicating member information is definitely notified by the VCS server 11 in the present embodiment. An embodiment of the first policy will be described with reference to FIG. 2 to FIG. 4, and an embodiment of the second policy will be described with reference to FIG. 5 to FIG. 6.

In FIG. 2, when A, B and D execute a three-party conference, the communicating member information of A is B (video communications) and D (video communications). After the conference is shifted to a three-party conference of A, B and C, the communicating member information of A is B (video communications) and C (video communications).

Next, a process of shifting a state of executing the three-party video conference of the VCS clients A, B and D as associated with the telephones to a state of executing the three-party video conference of the VCS clients A, B and C as associated with the telephones will be described. As shown in FIG. 2, to change the VCS client D to the VCS client C, the video communications between D and A, and between D and B are disconnected, and the video communications between C and A, and between C and B are established.

Figure 3:
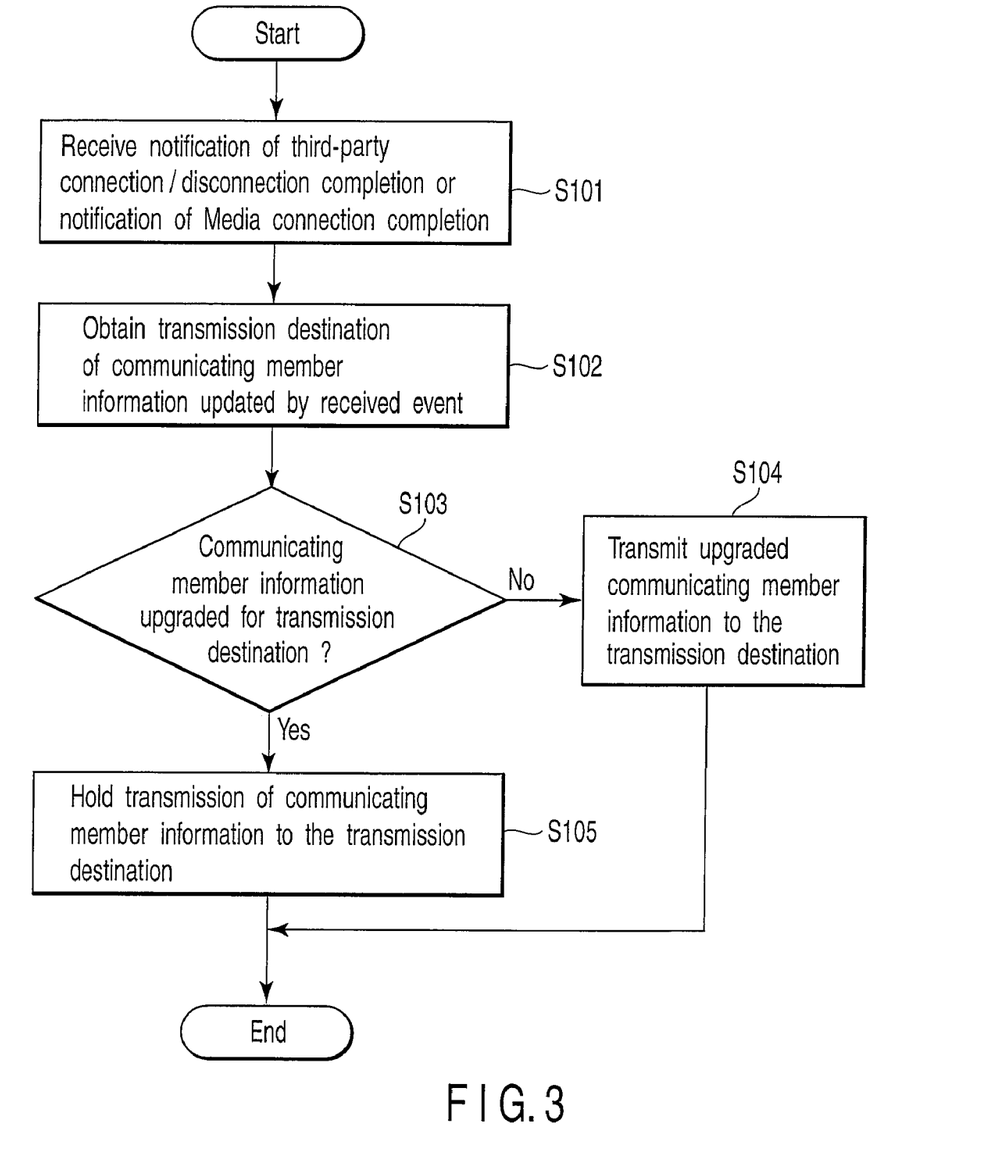
FIG. 3 is a flowchart showing a method of transmitting member information during communication.

FIG. 3 shows a flowchart describing a method of transmitting the communicating member information by the VCS server 11, in a case where the VCS server 11 receives a connection/disconnection completion notification (event) (hereinafter called third-party connection/disconnection completion notification) in response to the connection/disconnection request transmitted to the VCS client, or a case where the VCS server 11 receives a Media connection completion notification (event). In this embodiment, duplicated transmission of the communicating member information is held. In other words, when the communicating member information between the VCS clients for which connection is established or ended is transmitted to each of the VCS clients associated with the communicating member information, if it is understood that the communicating member information on the VCS clients is to be updated, transmission of the communicating member information is held, and the communicating member information is transmitted after the change in the connection state of the VCS client (even if the notification of completion or end of the connection is received from the VCS client, when the notification according to the change in the connection state of the VCS client has been received, the communicating member information is transmitted after the change in the connection state). For this reason, the load applied to the VCS server 1 can be reduced by restricting unnecessary information traffic.

The control unit 22 of the VCS server 11 receives from the VCS client the connection/disconnection completion notification (event) responding to the connection or disconnection request that is transmitted from the VCS server 11. Alternatively, the control unit 22 of the VCS server 11 receives the Media connection completion notification (event) from the VCS client (block S101). The control unit 22 of the VCS server 11 obtains the information of the VCS client to which the communicating member information to be updated on the basis of the received event is to be transmitted (block S102). The control unit 22 of the VCS server 11 discriminates whether the communicating member information is to be updated for the VCS client to which the communicating member information is to be transmitted (block S103). If it is discriminated by the control unit 22 of the VCS server 11 that the communicating member information is to be updated for the VCS client to which the communicating member information is to be transmitted in block S103 (the communicating member information is not latest: YES in block S103), the control unit 22 of the VCS server 11 holds the transmission of the communicating member information for the VCS client to which the communicating member information is to be transmitted (block S105). In other words, since it is known that the communicating member information is to be newly transmitted, the load applied to the VCS server 11 is reduced by restricting unnecessary information traffic. On the other hand, if it is discriminated in block S103 by the control unit 22 of the VCS server 11 that the communicating member information is not to be updated for the VCS client to which the communicating member information is to be transmitted (the communicating member information is latest: NO in block S103), the control unit 22 of the VCS server 11 transmits the communicating member information for the VCS client to which the communicating member information is to be transmitted (block S104).

Thus, the load applied to the VCS server 11 can be reduced by holding the transmission of duplicated communicating member information to the VCS client and restricting unnecessary information traffic.

Figure 4:
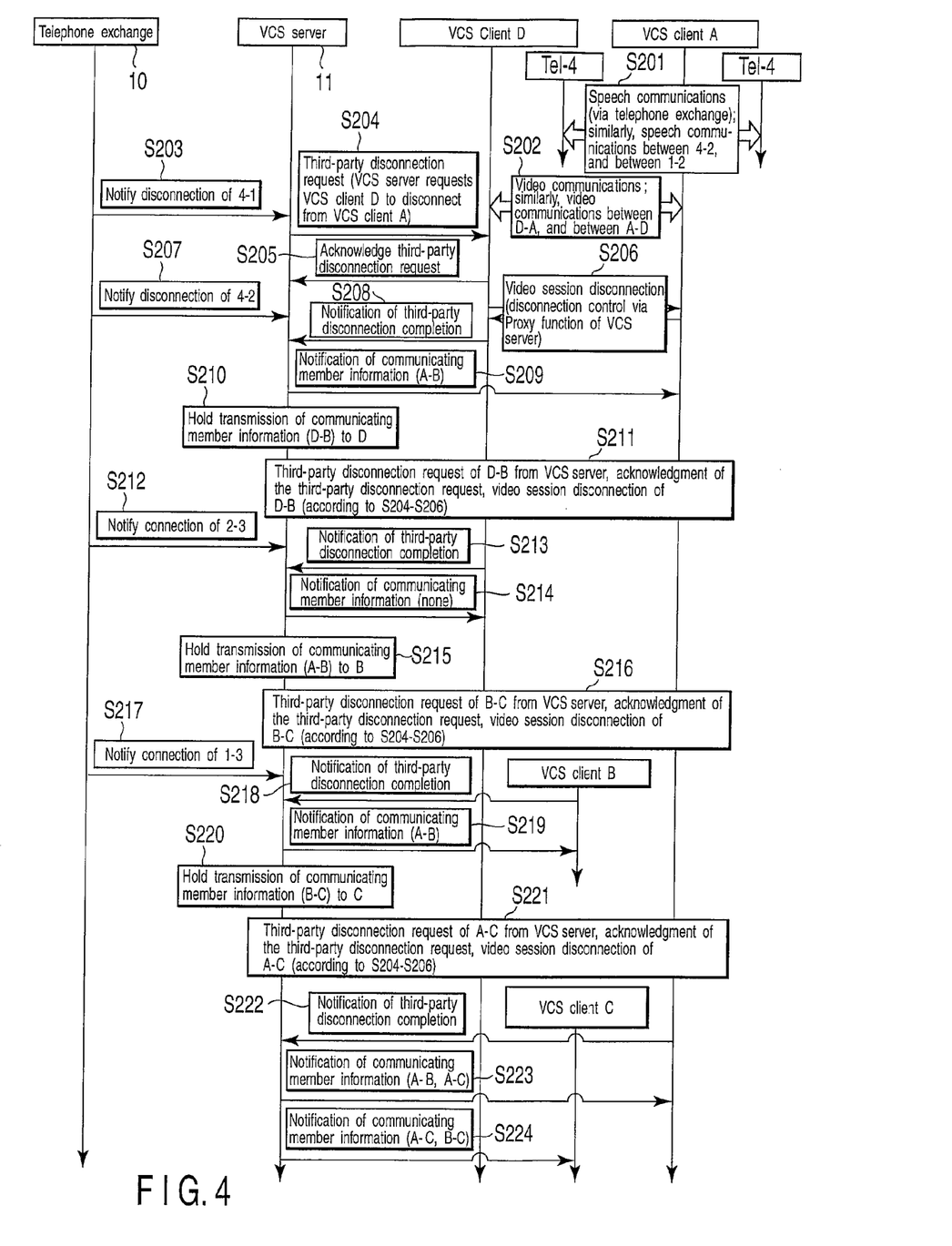
FIG. 4 is a sequence chart describing a process of changing a state in which VCS clients A, B and D are executing a video three-party conference associated with telephone to a state in which VCS clients A, B and C are executing a video three-party conference associated with telephone.

Next, FIG. 4 is a sequence chart describing a process of changing a state in which VCS clients A, B and D are executing a video three-party conference associated with telephone to a state in which VCS clients A, B and C are executing a video three-party conference associated with telephone. Actual block S of the connection and disconnection may not be the same as those in the case of FIG. 4. In the description of FIG. 4, "Tel-1" and "Tel-2" may be represented by only numbers "1" and "2", respectively, to make the description understandable.

First, Tel-1 and Tel-4 are executing speech communications with each other via the telephone switch 10. Similarly, speech communications are executed between Tel-2 and Tel-4 and between Tel-1 and Tel-2, via the telephone switch 10 (block S201). Similarly to the speech communications, video communications are executed between the VCS client A corresponding to Tel-1 and the VCS client D corresponding to Tel-4, between the VCS client B corresponding to Tel-2 and the VCS client D corresponding to Tel-4, and between the VCS client A corresponding to Tel-1 and the VCS client B corresponding to Tel-2 (block S202).

In the above-described state, if the speech communications between Tel-1 and Tel-4 are disconnected, the control unit 22 of the VCS server 11 receives a notification of disconnection of 4-1 (connection for the speech communications between Tel-1 and Tel-4) from the telephone switch 10 (block S203). In accordance with this, the VCS server 11 transmits to the VCS client D a third-party disconnection request to instruct disconnection from the VCS client A (block S204). The VCS client D transmits an acknowledgment of the third-party disconnection request to the VCS server 11 in response to the third-party disconnection request (block S205), and executes a disconnection process of a video session (video communications connection) with the VCS client A (block S206). At this time, the disconnection process between the VCS client D and VCS client A is executed by Proxy function of the VCS server 11.

In response to the third-party disconnection request, the VCS client D sends back an acknowledgment of the third-party disconnection request to the VCS server 11 (block S205). The VCS client D executes the disconnection process of the video session (video communications connection) from the VCS client A, via the Proxy function of the VCS server 11, together with the acknowledgment of the third-party disconnection request (block S206).

It is assumed that the speech communications between Tel-1 and Tel-4 are disconnected prior to the notification of third-party disconnection completion (block S208 to be described later). In accordance with the connection of the speech communications, the control unit 22 of the VCS server 11 receives the notification of disconnection (call information event) of 4-2 (connection of speech communications between Tel-4 and Tel-2) from the telephone switch 10 (block S207).

When the disconnection process of the video session (block S206) has been completed, the VCS client D transmits the notification of the third-party disconnection completion (disconnection of video communications of the VCS clients D-A) to the VCS server 11 (block S208). In accordance with transmission of the notification of third-party disconnection completion, the VCS server 11 transmits the communicating member information to the VCS clients A and D whose connection/disconnection state must have changed in a general case. Since the VCS server 11 has not received the notification (notification accompanying the disconnection or connection, for the VCS client A) from the telephone switch 10, the VCS server 11 transmits communicating member information "VCS clients A-B (video communications)" to the VCS client A (block S209).

If the VCS server 11 does not receive the notification of disconnection of 4-2 in block S207, the VCS server 11 should also transmit "VCS clients D-B (video communications)" to the VCS client D. However, since the VCS server 11 has already received notification of disconnection of 4-2 in block S207, it is estimated that the connection state of the VCS clients D-B will be changed soon. For this reason, the VCS server 11 holds the transmission of communicating member information "VCS clients D-B (video communications)" to the VCS client D (block S210). Thus, the load applied to the VCS server 11 can be reduced by restricting unnecessary traffic of the communicating member information.

In accordance with the notification of disconnection of 2-4 received in block S207, the VCS server 11 transmits the third-party disconnection request to the VCS client D. The VCS client D sends back an acknowledgment of the third-party disconnection request to the VCS server 11 and executes the disconnection process of the video session (video communications connection) between the VCS client D and the VCS client B (block S211). Since the process of block S211 is executed according to block S S204 to S206, detailed descriptions thereof are omitted.

It is assumed here that, prior to the notification of third-party disconnection completion (block S208, to be described later), the control unit 22 of the VCS server 11 receives a notification of connection (call information event) of 2-3 (connection of the speech communications between Tel-2 and Tel-3) from the telephone switch 10 (block S212).

When the VCS client D has completed the disconnection process of video session between the VCS client D and the VCS client B, the VCS client D transmits the notification of third-party disconnection completion (disconnection of video communications of VCS clients D-B) to the VCS server 11 (block S213).

In accordance with this, the VCS server 11 transmits the communicating member information to the VCS clients D and B whose connection/disconnection state must have changed in a general case.

Since the VCS server 11 has not received the notification accompanying the disconnection or connection, for the VCS client D, from the telephone switch 10, the VCS server 11 transmits communicating member information "no members" to the VCS client D (block S214).

If the VCS server 11 does not receive the notification of connection of 2-3 in block S212, the VCS server 11 should also transmit "VCS clients A-B (video communications)" to the VCS client B. However, since the VCS server 11 has already received the notification of connection of 2-3 in block S212, it is estimated that the connection state of the VCS clients B-C will be changed soon. For this reason, the VCS server 11 holds the transmission of communicating member information "VCS clients A-B (video communications)" to the VCS client B (block S215). Thus, the load applied to the VCS server 11 can be reduced by restricting unnecessary traffic of the communicating member information.

In accordance with the notification of connection of 2-3 received in block S212, the VCS server 11 transmits the third-party connection request to the VCS client B. The VCS client B sends back an acknowledgment of the third-party connection request to the VCS server 11. The VCS client B executes the connection process of the video session (video communications connection) between the VCS client B and the VCS client C (block S216). The connection and disconnection are different in process contents. However, since the process of block S216 is executed according to block S S204 to S206, detailed descriptions thereof are omitted.

It is assumed here that, prior to the notification of third-party disconnection completion (block S218, to be described later), the control unit 22 of the VCS server 11 receives a notification of connection (call information event) of 1-3 (connection of the speech communications between Tel-1 and Tel-3) from the telephone switch 10 (block S217).

When the VCS client B has completed the disconnection process of video session between the VCS client B and the VCS client C, the VCS client B transmits the notification of third-party connection completion (connection of video communications of VCS clients B-C) to the VCS server 11 (block S218).

In accordance with this, the VCS server 11 transmits the communicating member information to the VCS clients B and C whose connection/disconnection state must have changed in a general case. Since the VCS server 11 has not received the notification accompanying the disconnection or connection, for the VCS client B, from the telephone switch 10, the VCS server 11 transmits communicating member information "VCS clients A-B (video communications)" to the VCS client B (block S219).

If the VCS server 11 does not receive the notification of connection of 1-3 in block S217, the VCS server 11 should also transmit "VCS clients B-C (video communications)" to the VCS client C. However, since the VCS server 11 has already received the notification of connection of 1-3 (VCS clients A-C) in block S217, it is estimated that the connection state of the VCS clients A-C will be changed soon. For this reason, the VCS server 11 holds the transmission of communicating member information "VCS clients B-C (video communications)" to the VCS client C (block S220). Thus, the load applied to the VCS server 11 can be reduced by restricting unnecessary traffic of the communicating member information.

In accordance with the notification of connection of 1-3 received in block S217, the VCS server 11 transmits the third-party connection request to the VCS client A. The VCS client A sends back an acknowledgment of the third-party connection request to the VCS server 11. The VCS client A executes the connection process of the video session (video communications connection) between the VCS client A and the VCS client C (block S221). The connection and disconnection are different in process contents. However, since the process of block S221 is executed according to block S S204 to S206, detailed descriptions thereof are omitted.

Subsequently, when the VCS client A has completed the disconnection process of video session between the VCS client A and the VCS client C, the VCS client A transmits the notification of third-party connection completion (connection of video communications of VCS clients A-C) to the VCS server 11 (block S222). The VCS server 11 transmits the communicating member information to the VCS clients A and C whose connection/disconnection state has been varied. In other words, the VCS server 11 transmits communicating member information "VCS clients A-B (video communications) and A-C (video communications)" to the VCS client A (block S223). Moreover, the VCS server 11 transmits communicating member information "VCS clients A-C (video communications) and B-C (video communications)" to the VCS client C (block S224).

Thus, the load applied to the VCS server 11 can be reduced by restricting the traffic of the communicating member information. In other words, three-time transmission of the communicating member information in block S210, block S215 and block S220 can be held, and the server transmission process, the network load, the clients' reception processes and the member information notification process can be reduced. In addition, not only the amount of the communicating member information, but also the amount of information on all the headers required for message transmission (IP header, UDP header, SIP (Session Initiation Protocol) header, in a case where SIP is used for the session control) can be reduced. Furthermore, as the number of VCS clients connected to the VCS server 11 is increased, the traffic of synergistically increased communicating member information can be restricted, and the load applied to the VCS server 11 can be further reduced. For this reason, a case where one of members in a three-party conference is replaced has been described in the above embodiment. However, if participants of a multi-party conference are increased and sequentially replacing members are increased, the effect of reducing the load is enhanced significantly.

Figure 5:
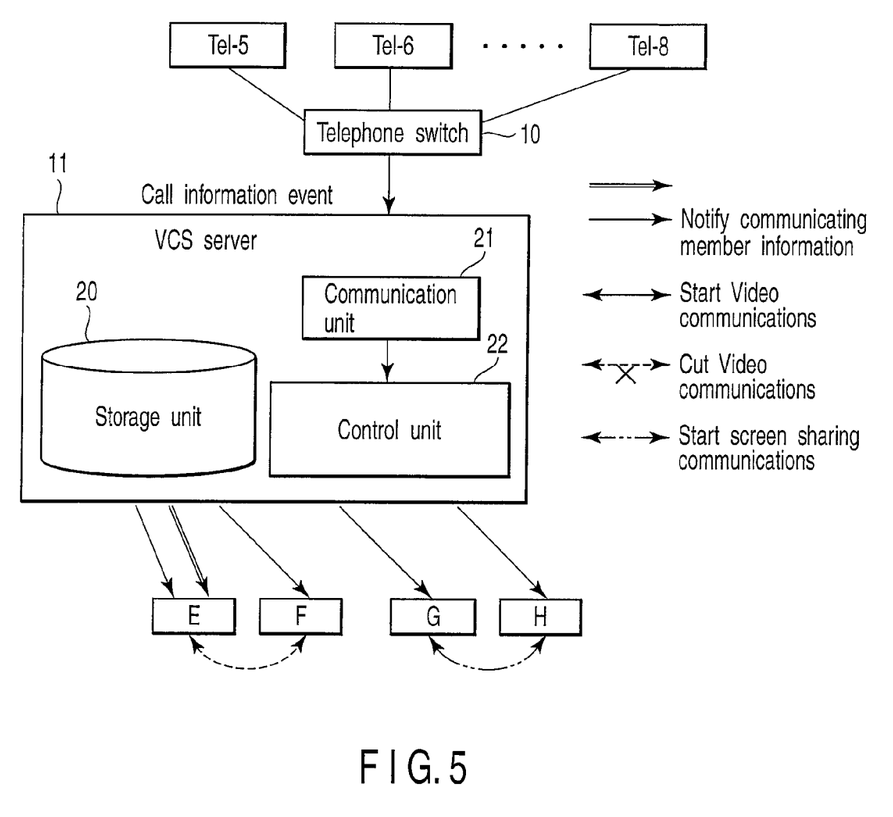
FIG. 5 is a schematic illustration showing a configuration of a communication system according to a modified embodiment of the present invention.

Next, FIG. 5 shows a modified example of the above-described embodiment. In the modified example, the configuration of the VCS server 11 is the same as that in the above-described embodiment except a feature that paired VCS clients E to H are telephone terminals Tel-5 to Tel-8, respectively. Of the VCS clients E to H, the VCS clients E and F execute the video communications while the VCS clients G and H execute the video communications and screen-sharing communications. A policy of notification of the communicating member information from the server is set below as described above:

"Notify at any time not only the information of the member with which the VCS client is currently communicating, but also the VCS client communicating member information except the VCS client".

In other words, even when the VCS client does not execute video communications or screen sharing communications, if the connection of the VCS client with the VCS server 11 is established, the entry name is displayed on the VCS client.

Figure 6:
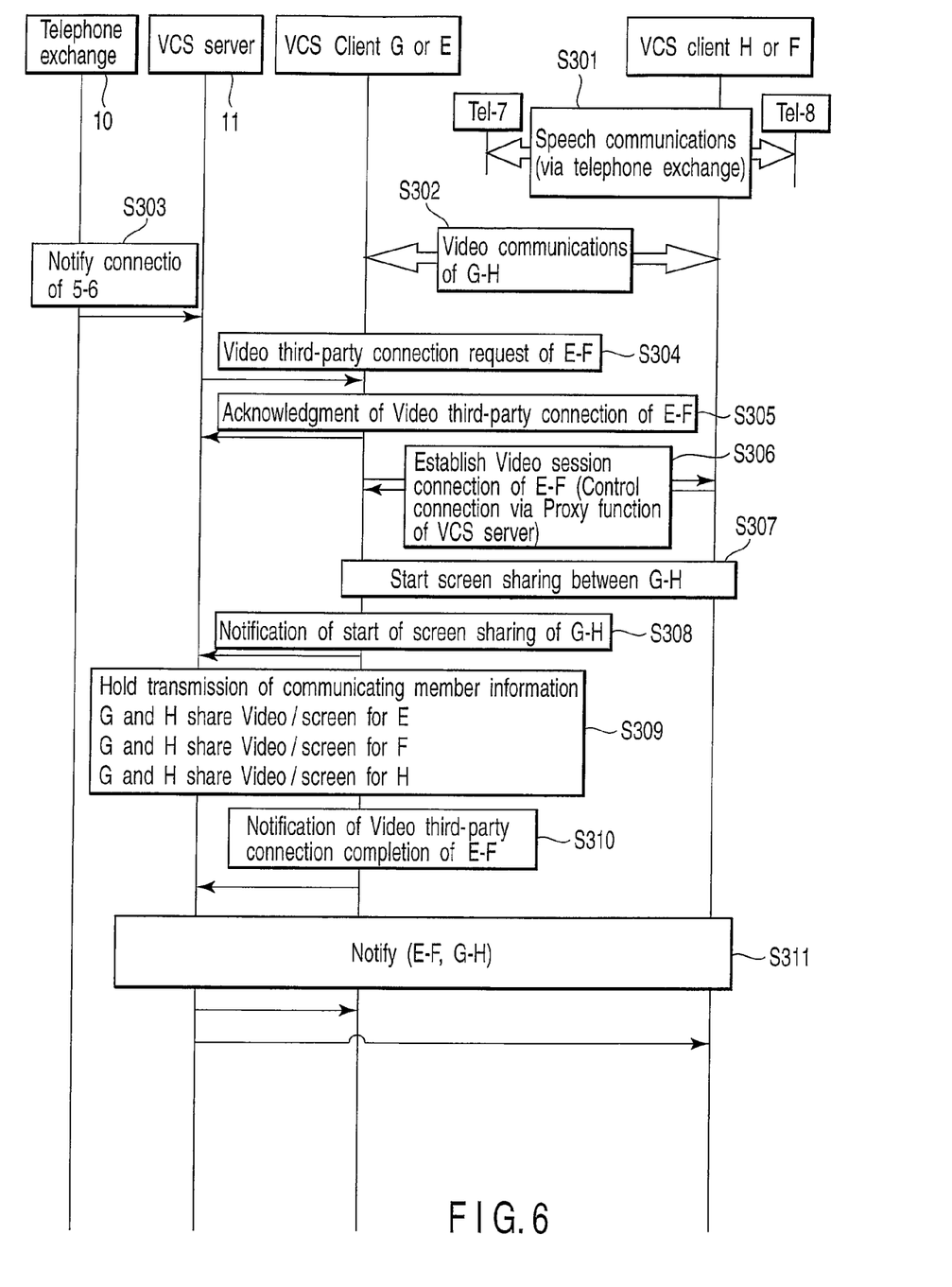
FIG. 6 is a sequence chart describing a process of the communication system according to the modified embodiment of the present invention.

FIG. 6 is a sequence chart describing a process of the above-described modified example. Actual block S of the connection and disconnection may not be the same as those in the case of FIG. 6.

In the modified example, four VCS clients E to H are connected to the VCS server 11, telephone terminals Tel-5 to Tel-8 corresponding respectively to the clients are connected to the telephone exchange 10, and each of the VCS clients E to H wishes to know the own communications state.

First, it is assumed that Tel-7 and Tel-8 are executing speech communications with each other via the telephone exchange 10 (block S301). Similarly to the speech communications, the VCS client G corresponding to Tel-7 and the VCS client H corresponding to Tel-8 are executing video communications with each other (block S302).

In the above state, the VCS server 11 receives a notification of connection of 5-6 (Tel-5 and Tel-6) (block S303).

When the VCS server 11 receives the notification of connection, the VCS server 11 transmits a video (communications) third-party connection request to require video connection between the VCS clients E and F to the VCS client E (block S304). The VCS client E sends back an acknowledgment of the video (communications) third-party connection request between the VCS clients E and F to the VCS server 11 (block S305). In addition, the VCS client E executes the connection process of the video session (video communications) between the VCS clients E and F, together with the VCS client F (block S306). At this time, the VCS client E executes the connection process via the Proxy function of the VCS server 11.

Screen sharing communications (and video communications) between the VCS clients G and H are started (block S307). The VCS client G transmits a notification of start of the screen sharing communications between the VCS clients G and H, to the VCS server 11 (block S308).

At this time, the VCS server 11 must transmit to the VCS clients E to H communicating member information "VCS client G (video/screen sharing communications) and the VCS client H (video/screen sharing communications) (except information of the transmission destination)". However, since the VCS server 11 has received the notification of connection of 5-6 in block S303, it is estimated that the connection state on the video communications between the VCS clients E-F will be changed soon.

Therefore, when the VCS server 11 received the notification of start of screen sharing between the VCS clients G and H in block S308, the VCS server 11 holds the transmission of communicating member information "VCS clients G-H (video communications/screen sharing communications)" to the VCS clients E-H (block S309).

In other words, when the VCS server 11 transmits the communicating member information between the VCS clients in which either the establishment or end of the connection was executed, to each of the VCS clients, if the change of the communicating member information can be estimated, the VCS server 11 holds the transmission of the communicating member information.

Thus, the load applied to the VCS server 11 can be reduced by restricting unnecessary traffic of the communicating member information.

When the connection of video session between the VCS clients E and F has been completed, the VCS client E transmits the notification of video third-party connection completion between the VCS clients E-F to the VCS server 11 (block S310).

Finally, the VCS server 11 transmits communicating member information "VCS clients E-F (video communications) and VCS clients G-H (video communications/screen sharing communications)" to the VCS clients E-H (block S311).

In the modified example, too, the same advantage as that of the above-described embodiment can be obtained.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A visual communication server, connected to a telephone exchange for controlling line connection between telephone terminals and to client computers arranged in accordance with the respective telephone terminals to execute video data communications, via networks, the server comprising:
   a call information event receiving unit which receives a call information event generated by behavior of the telephone terminal, from the telephone exchange;
   a control unit which instructs establishment and end of connection for the video data communications between the client computers corresponding to the telephone terminals, in accordance with the call information event received by the call information event receiving unit; and
   a connection information transmitting unit which transmits connection information between the client computers for which one of the establishment and the end of connection is executed by the control unit,
   wherein even if the connection information transmitting unit receives a notification of completion or end of the connection from the client computers, when the connection information transmitting unit receives a notification which accompanies change of connection states of the client computers, the connection information transmitting unit transmits the connection information after waiting for the change of the connection states.

2. The visual communication server according to claim 1, wherein the connection information transmitting unit transmits connection information of all the client computers having connection with the visual communication server established, to the client computers, and
   even if the connection information transmitting unit receives a notification of completion or end of the connection from the client computers, when the connection information transmitting unit receives a notification which accompanies change of a connection state of any one of the client computers, the connection information transmitting unit transmits the connection information after waiting for the change of the connection states.

3. The visual communication server according to claim 1, wherein when the video data communications are not executed after the establishment of the connection for the video data communications between the plurality of client computers, the control unit is capable of setting, for each of the plurality of client computers, notification of a communication state of the client computer having the connection established.

4. A communications system composed of a visual communication server, connected to a telephone exchange for controlling line connection between telephone terminals and to client computers arranged in accordance with the respective telephone terminals to execute video data communications, via networks,
   the server comprising:
   a call information event receiving unit which receives a call information event generated by behavior of the telephone terminal, from the telephone exchange;
   a control unit which instructs establishment and end of connection for the video data communications between the client computers corresponding to the telephone terminals, in accordance with the call information event received by the call information event receiving unit; and a connection information transmitting unit which transmits connection information between the plurality of client computers for which one of the establishment and the end of connection is executed by the control unit, wherein even if the connection information transmitting unit receives a notification of completion or end of the connection from the client computers, when the connection information transmitting unit receives a notification which accompanies change of connection states of the client computers, the connection information transmitting unit transmits the connection information after waiting for the change of the connection states.

5. The system according to claim 4, wherein the connection information transmitting unit transmits connection information of all the client computers having connection with the visual communication server established, to the client computers, and even if the connection information transmitting unit receives a notification of completion or end of the connection from the client computers, when the connection information transmitting unit receives a notification which accompanies change of a connection state of any one of the client computers, the connection information transmitting unit transmits the connection information after waiting for the change of the connection states.

6. The system according to claim 4, wherein when the video data communications are not executed after the establishment of the connection for the video data communications between the plurality of client computers, the control unit is capable of setting, for each of the plurality of client computers, notification of a communication state of the client computer having the connection established.

* * * * *